US012341323B2

(12) United States Patent
Ledbetter et al.

(10) Patent No.: US 12,341,323 B2
(45) Date of Patent: Jun. 24, 2025

(54) APPARATUS AND METHOD FOR DRILL MOTOR RACKING OF SWITCHGEAR

(71) Applicant: CBS ArcSafe, Inc., Denton, TX (US)

(72) Inventors: Finley Lee Ledbetter, Argyle, TX (US); Russell R. Safreed, III, Saint Albans, WV (US); Paul Blake, Saint Albans, WV (US)

(73) Assignee: CBS ArcSafe, Inc., Denton, TX (US)

( * ) Notice: Subject to any disclaimer, the term of this patent is extended or adjusted under 35 U.S.C. 154(b) by 400 days.

(21) Appl. No.: 17/579,412

(22) Filed: Jan. 19, 2022

(65) Prior Publication Data
US 2022/0239075 A1 Jul. 28, 2022

Related U.S. Application Data

(60) Provisional application No. 63/142,372, filed on Jan. 27, 2021.

(51) Int. Cl.
*H02B 11/133* (2006.01)
*B25B 21/00* (2006.01)
(Continued)

(52) U.S. Cl.
CPC .......... *H02B 11/133* (2013.01); *B25B 21/002* (2013.01); *B25F 5/001* (2013.01); *H01H 3/227* (2013.01)

(58) Field of Classification Search
CPC . E21B 7/00; E21B 7/002; E21B 7/046; E21B 7/062; E21B 7/064; E21B 10/00; E21B 11/005; F16C 1/00; F16C 1/10; F16C 1/12; F16C 1/14; F16C 2352/00; H01H 3/22; H01H 3/227; H01H 3/32;
(Continued)

(56) References Cited

U.S. PATENT DOCUMENTS 5,477,017 A 12/1995 Swindler et al.
8,307,545 B1 * 11/2012 Ledbetter ................ H02B 3/00
200/50.21
(Continued)

FOREIGN PATENT DOCUMENTS

CN 203632041 U * 6/2014

OTHER PUBLICATIONS

International Search Report on PCT/US2022/013256 Dtd Apr. 14, 2022.

*Primary Examiner* — Anthony R Jimenez
(74) *Attorney, Agent, or Firm* — Foley & Lardner LLP

(57) ABSTRACT

A drill motor racking apparatus for remote operation of a circuit breaker is disclosed. The drill motor racking apparatus comprises: a racking adapter, wherein the racking adapter is adapted to be engaged by and secured in a racking mechanism of a circuit breaker; a gearbox having an input and an output; a flexible shaft cable having a first end and a second end, wherein the racking adapter is connected to the first end of the flexible shaft cable and wherein the gearbox is incorporated between the flexible shaft cable and the racking adapter to provide a torque multiplication required to rack the circuit breaker; and a drill adapter adapted to be engaged by and secured in a drill, wherein the drill adapter is attached to the second end of the flexible shaft cable. A method of using the drill motor racking apparatus is also disclosed.

25 Claims, 6 Drawing Sheets

(51) Int. Cl.
*B25F 5/00* (2006.01)
*H01H 3/22* (2006.01)

(58) Field of Classification Search
CPC ..... H01H 3/38; B25F 1/00; B25F 1/02; B25F 1/04; B25F 5/00; B25F 5/001; B25F 5/025; B25B 21/002; B25B 21/007; B25B 21/02; B25B 23/00; B25B 23/0035; B25B 23/0007; B25B 23/14; B25B 23/1405; B25B 23/141; B25B 23/142; B25B 23/1422; B25B 23/1425; B25B 23/147; B25B 23/1475; B25B 23/15; H02B 11/00; H02B 11/12; H02B 11/127; H02B 11/133; B23P 19/00
USPC ...................................................... 200/50.01
See application file for complete search history.

(56) References Cited

U.S. PATENT DOCUMENTS

| | | |
|---|---|---|
| 2009/0014291 A1 | 1/2009 | Stevenson |
| 2013/0258104 A1 | 10/2013 | McClung et al. |
| 2015/0075883 A1 | 3/2015 | Ward |
| 2017/0063055 A1 | 3/2017 | Bower et al. |

\* cited by examiner

500

```
┌─────────────────────────────────────────────────────────────────────┐
│  INSERTING A RACKING ADAPTER OF A DRILL MOTOR RACKING APPARATUS     │
│       INTO A RACKING MECHANISM OF A CIRCUIT BREAKER         505     │
└─────────────────────────────────────────────────────────────────────┘
                                  │
                                  ▼
┌─────────────────────────────────────────────────────────────────────┐
│   INSERTING A DRILL ADAPTER OF THE DRILL MOTOR RACKING APPARATUS    │
│              INTO A CHUCK OF A DRILL                        510     │
└─────────────────────────────────────────────────────────────────────┘
                                  │
                                  ▼
┌─────────────────────────────────────────────────────────────────────┐
│  OPERATING THE DRILL COUNTERCLOCKWISE (OR CLOCKWISE DEPENDING       │
│    ON THE CIRCUIT BREAKER) TO RACK-OUT THE CIRCUIT BREAKER   515    │
└─────────────────────────────────────────────────────────────────────┘
                                  │
                                  ▼
┌─────────────────────────────────────────────────────────────────────┐
│ STOPPING OPERATION OF THE DRILL WHEN THE CIRCUIT BREAKER REACHES    │
│         A TEST POSITION OR A REMOVE POSITION                 520    │
└─────────────────────────────────────────────────────────────────────┘
```

FIG. 5

```
                                                          600
┌─────────────────────────────────────────────────────────────┐
│  INSERTING A RACKING ADAPTER OF A DRILL MOTOR RACKING       │
│  APPARATUS INTO A RACKING MECHANISM OF A CIRCUIT BREAKER    │
│                                                         605 │
└─────────────────────────────────────────────────────────────┘
                              │
                              ▼
┌─────────────────────────────────────────────────────────────┐
│  INSERTING A DRILL ADAPTER OF THE DRILL MOTOR RACKING       │
│  APPARATUS INTO A CHUCK OF A DRILL                          │
│                                                         610 │
└─────────────────────────────────────────────────────────────┘
                              │
                              ▼
┌─────────────────────────────────────────────────────────────┐
│  OPERATING THE DRILL CLOCKWISE (OR COUNTERCLOCKWISE         │
│  DEPENDING ON THE CIRCUIT BREAKER) TO RACK-IN THE           │
│  CIRCUIT BREAKER                                        615 │
└─────────────────────────────────────────────────────────────┘
                              │
                              ▼
┌─────────────────────────────────────────────────────────────┐
│  STOPPING THE OPERATION OF THE DRILL WHEN THE CIRCUIT       │
│  BREAKER REACHES A CONNECTED POSITION                       │
│                                                         620 │
└─────────────────────────────────────────────────────────────┘
                              │
                              ▼
┌─────────────────────────────────────────────────────────────┐
│  OPTIONALLY, REMOVING THE RACKING ADAPTER OF THE DRILL      │
│  MOTOR RACKING APPARATUS FROM THE RACKING MECHANISM         │
│  OF THE CIRCUIT BREAKER                                 625 │
└─────────────────────────────────────────────────────────────┘
```

FIG. 6

APPARATUS AND METHOD FOR DRILL MOTOR RACKING OF SWITCHGEAR

PRIOR RELATED APPLICATIONS

This application claims the benefit of U.S. Provisional Patent Application Ser. No. 63/142,372 entitled "Apparatus and Method for Drill Motor Racking of Switchgear," filed on Jan. 27, 2021, which is incorporated by reference herein in its entirety.

FEDERALLY SPONSORED RESEARCH STATEMENT

Not Applicable (N/A)

REFERENCE TO MICROFICHE APPENDIX

N/A

FIELD OF INVENTION

The disclosure is related to the operation of a circuit breaker that have a racking screw or a racking shaft to facilitate removal of the breaker from its cubicle, and in particular, to a portable device that facilitates the remote racking of such circuit breaker.

BACKGROUND OF THE INVENTION

In larger circuit breaker systems, a typical circuit breaker may be disconnected from the buss and removed from its cubicle by a method described in the industry as "racking" the breaker. This may be accomplished by an operator who uses a temporary hand crank to physically rotate a racking screw located on the face of the circuit breaker.

In order to effect the operation described above, the operator must stand within arms-reach of the circuit breaker, which also means the operator is in close proximity to the circuit breaker. If the circuit breaker should happen to fail catastrophically, the operator is at risk of serious injury or death from the resulting arc-blast and flying debris.

Recognizing the potential hazard of personal injury associated with the local racking operation of an electrical circuit breaker, there is a need for a portable, easy-to-use apparatus that provides a means for remotely racking the circuit breaker from a safe distance.

The apparatus should be easy to use, relatively low weight and cost effective.

SUMMARY OF THE INVENTION

An object of the disclosure is to provide a portable apparatus that facilitates the remote racking of a circuit breaker by means of utilizing a commercially available drill motor. Another object of the disclosure is to provide a portable apparatus that is operated from a distance that allows an operator to be positioned a safe distance away from the circuit breaker that is being operated. Yet another object of this disclosure is to provide a portable actuating apparatus that is temporarily affixed to the circuit breaker, in order to facilitate portable use of the invention, without the need of permanently modifying or altering the circuit breaker or its racking system. Yet another object of this disclosure is to provide a means of remotely racking a circuit breaker without external power except for that mechanical rotational power provided by the commercially available drill motor.

In an embodiment, a drill motor racking apparatus for remote operation of a circuit breaker comprises a racking adapter, a gearbox, a flexible shaft cable, and a drill adapter.

In an embodiment, the racking adapter is adapted to be engaged by and secured in a racking mechanism of the circuit breaker. In an embodiment, the racking adapter comprises a socket. In an embodiment, the racking adapter comprises a shaft.

In an embodiment, the racking adapter is adapted to be secured to the racking mechanism of the circuit breaker by an engagement means.

In an embodiment, the engagement means is one or more of a bracket, a friction fit, a latch, and a magnet. In an embodiment, the engagement means is a friction fit.

In an embodiment, the gearbox has an input and an output. In an embodiment, the gearbox is incorporated between the flexible shaft cable and the racking adapter to provide a torque multiplication required to rack the circuit breaker.

In an embodiment, the flexible shaft cable has a first end and a second end. In an embodiment, the racking adapter is connected to the first end of the flexible shaft cable. In an embodiment, the flexible shaft cable is from about 10-feet to about 30-feet. In an embodiment, the flexible shaft cable is from about 15-feet to about 20-feet. In an embodiment, the flexible shaft cable is about 18-feet.

In an embodiment, the flexible shaft cable comprises a nonconductive linkage or a nonconductive section. In an embodiment, the nonconductive linkage or the nonconductive section is made of plastic or polymer resin.

In an embodiment, the drill adapter is adapted to be engaged by and secured in a drill. In an embodiment, the drill adapter is attached to the second end of the flexible shaft cable.

In an embodiment, the drill motor racking apparatus further comprises a housing. In an embodiment, the housing is disposed around the second end of the flexible shaft cable.

In an embodiment, the drill motor racking apparatus further comprises an ergonomic or mechanical torque limiter to limit torque to the circuit breaker.

In an embodiment, the drill motor racking apparatus further comprises an ergonomic torque limiter to limit torque to the circuit breaker. In an embodiment, the ergonomic torque limiter has a mechanical feedback in contact with an operator.

In an embodiment, the drill motor racking apparatus further comprises a mechanical torque limiter to limit torque to the circuit breaker. In an embodiment, the mechanical torque limiter is incorporated in the input to the gearbox.

In an embodiment, the drill motor racking apparatus further comprises one or more of an audible alarm, a notification and a visual alarm when the torque limiter reaches a limit.

In an embodiment, the drill motor racking apparatus further comprises one or more of an audible alarm, a notification, and a visual alarm when the torque limiter releases rotational motion to into the gearbox.

In an embodiment, the drill motor racking apparatus further comprises a drill. In an embodiment, the drill adapter is engaged by and secured in the drill. In an embodiment, the drill adapter is engaged by and secured in a chuck of the drill. In an embodiment, the drill is a cordless drill. In an embodiment, the drill is a corded drill. In an embodiment, the drill is hand operated. In an embodiment, the drill is machine operated.

In an embodiment, the drill motor racking apparatus further comprises a revolution counter capable of counting the revolutions of the drill. In an embodiment, the revolution counter counts the revolutions of the drill.

In an embodiment, the drill motor racking apparatus further comprises a housing or a sleeve. In an embodiment, the housing or the sleeve is disposed around the second end of the flexible shaft cable.

In an embodiment, the drill motor racking apparatus further comprises a nonconductive housing or a nonconductive sleeve. In an embodiment, the nonconductive housing or the nonconductive sleeve is disposed around the second end of the flexible shaft cable. In an embodiment, the nonconductive housing or the nonconductive sleeve is made of plastic or polymer resin.

In an embodiment, a method to rack-out a circuit breaker comprises (a) inserting a racking adapter of a drill motor racking apparatus into a racking mechanism of a circuit breaker, (b) inserting a drill adapter of the drill motor racking apparatus into a chuck of a drill, (c) operating the drill counterclockwise (or clockwise depending on the circuit breaker) to rack-out the circuit breaker, and (d) stopping operation of the drill when the circuit breaker reaches a test position or a remove position.

In an embodiment, step (b) further comprises tightening the chuck of the drill until the drill adapter of the drill motor racking apparatus is secure.

In an embodiment, step (c) further comprises securely grasping the drill in one hand of an operator and a housing or a sleeve of the drill motor racking apparatus securely in the other hand of the operator.

In an embodiment, a method to rack-in a circuit breaker comprises (a) inserting a racking adapter of a drill motor racking apparatus into a racking mechanism of a circuit breaker, (b) inserting a drill adapter of the drill motor racking apparatus into a chuck of a drill, (c) operating the drill clockwise (or counterclockwise depending on the circuit breaker) to rack-in the circuit breaker, and (d) stopping the operation of the drill when the circuit breaker reaches a connected position.

In an embodiment, step (c) further comprises securely grasping the drill in one hand of an operator and a housing or a sleeve of the drill motor racking apparatus securely in the other hand of the operator.

In an embodiment, the method further comprises (e) removing the racking adapter of the drill motor racking apparatus from the racking mechanism of the circuit breaker.

These and other objects, features and advantages will become apparent as reference is made to the following detailed description, preferred embodiments, and examples, given for the purpose of disclosure, and taken in conjunction with the accompanying drawings and appended claims.

BRIEF DESCRIPTION OF THE DRAWINGS

For a further understanding of the nature and objects of the present invention, reference should be made to the following detailed disclosure, taken in conjunction with the accompanying drawings, in which like parts are given like reference numerals, and wherein:

FIG. 5 illustrates a flow chart of a method to rack-out circuit breaker; and

FIG. 6. Illustrates a flowchart of a method to rack-in a circuit breaker.

DETAILED DESCRIPTION OF EMBODIMENTS OF THE INVENTION

The following detailed description of various embodiments of the present invention references the accompanying drawings, which illustrate specific embodiments in which the invention can be practiced. While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains. Therefore, the scope of the present invention is defined only by the appended claims, along with the full scope of equivalents to which such claims are entitled.

In the following detailed description and the attached drawings, specific details are set forth to provide a thorough understanding of the present disclosure. However, those skilled in the art will appreciate that the present disclosure may be practiced, in some instances, without such specific details. In other instances, well-known elements have been illustrated in schematic or block diagram form in order not to obscure the present disclosure in unnecessary detail. Additionally, for the most part, specific details, and the like, have been omitted inasmuch as such details are not considered necessary to obtain a complete understanding of the present disclosure, and are considered to be within the understanding of persons of ordinary skill in the relevant art.

Apparatus for Drill Motor Racking of Switchgear

Figure 1:
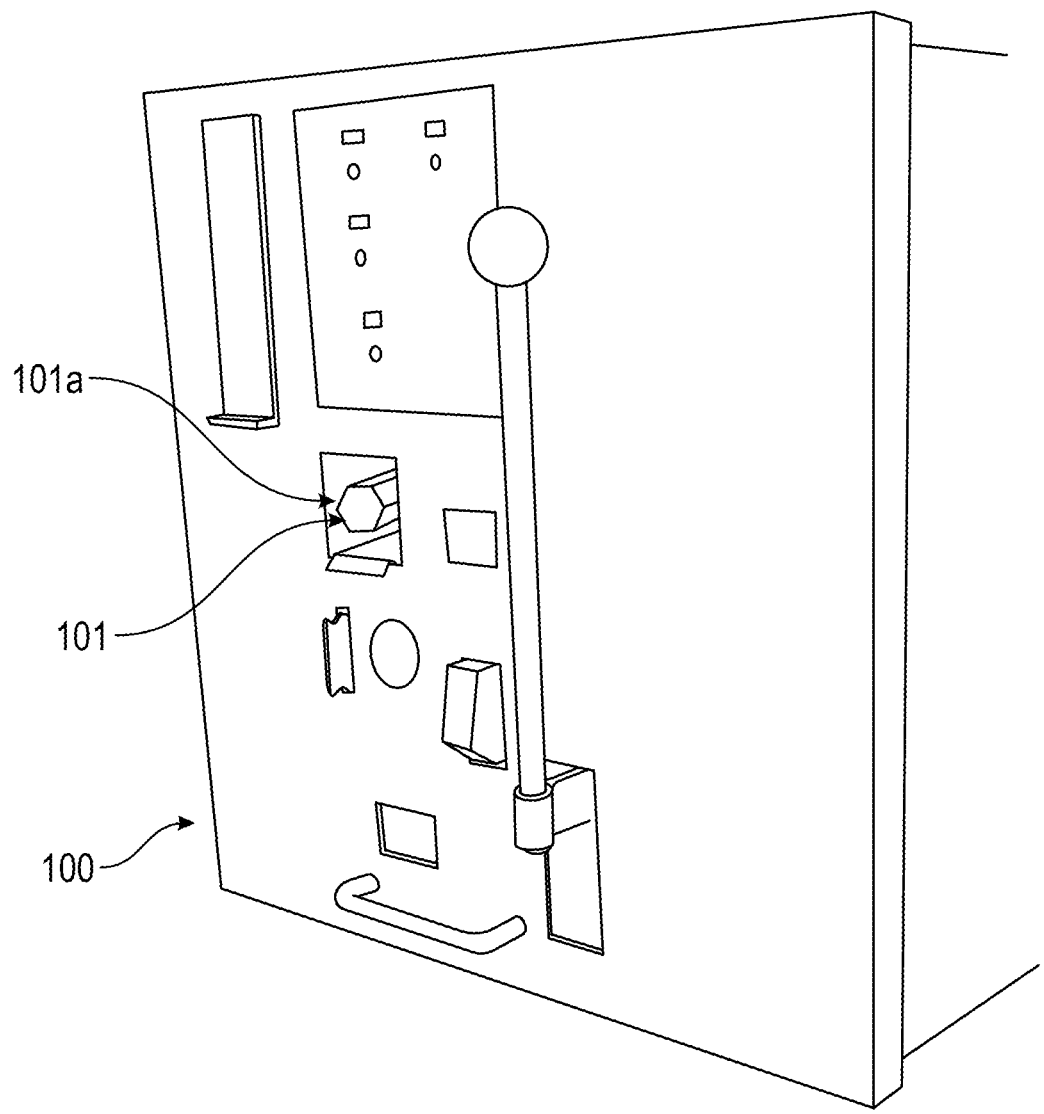
FIG. 1 illustrates a front, right perspective view of a typical draw-out circuit breaker.
Figure 2:
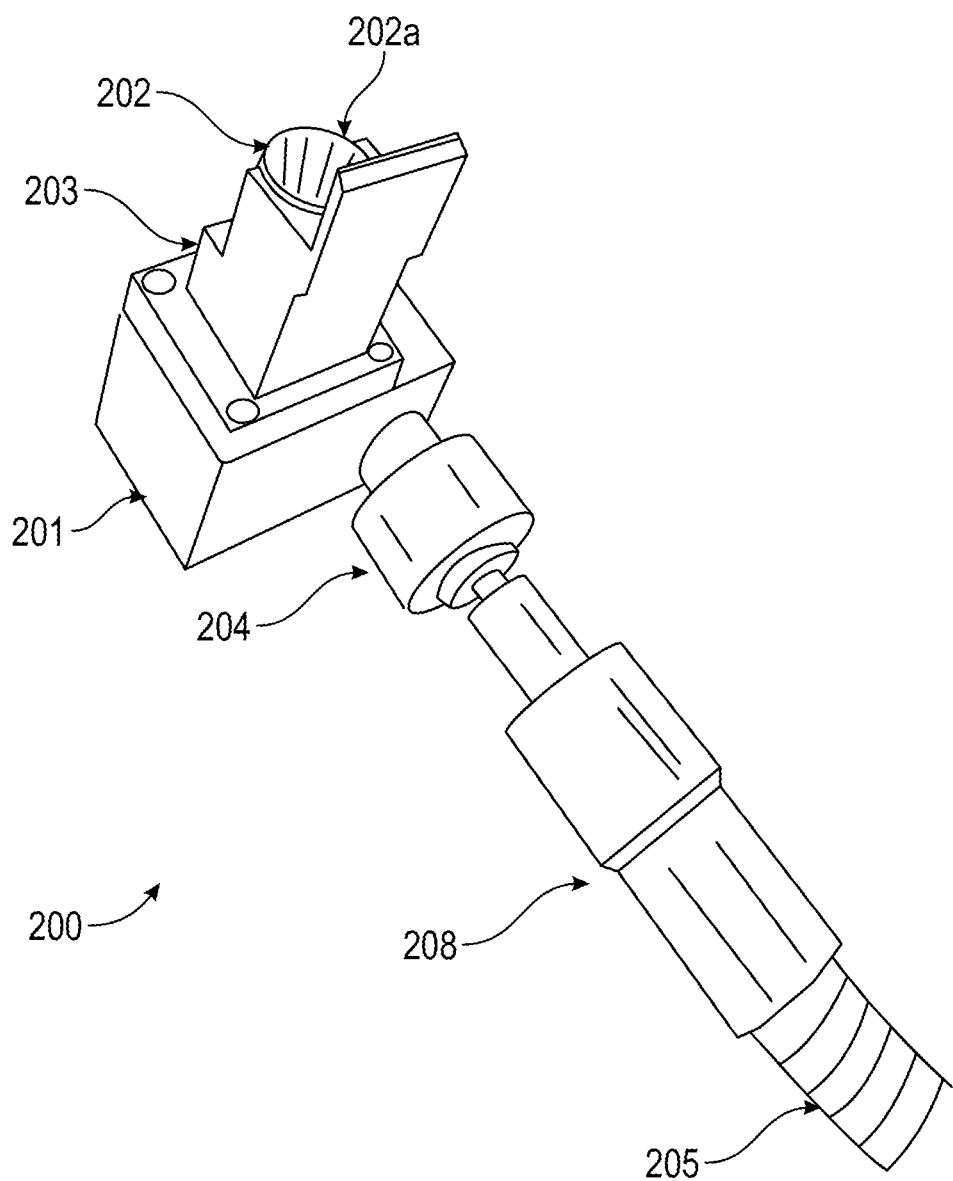
FIG. 2 illustrates a rear, left perspective view of an exemplary drill motor racking apparatus, showing a first end capable of engaging the circuit breaker.
Figure 3:
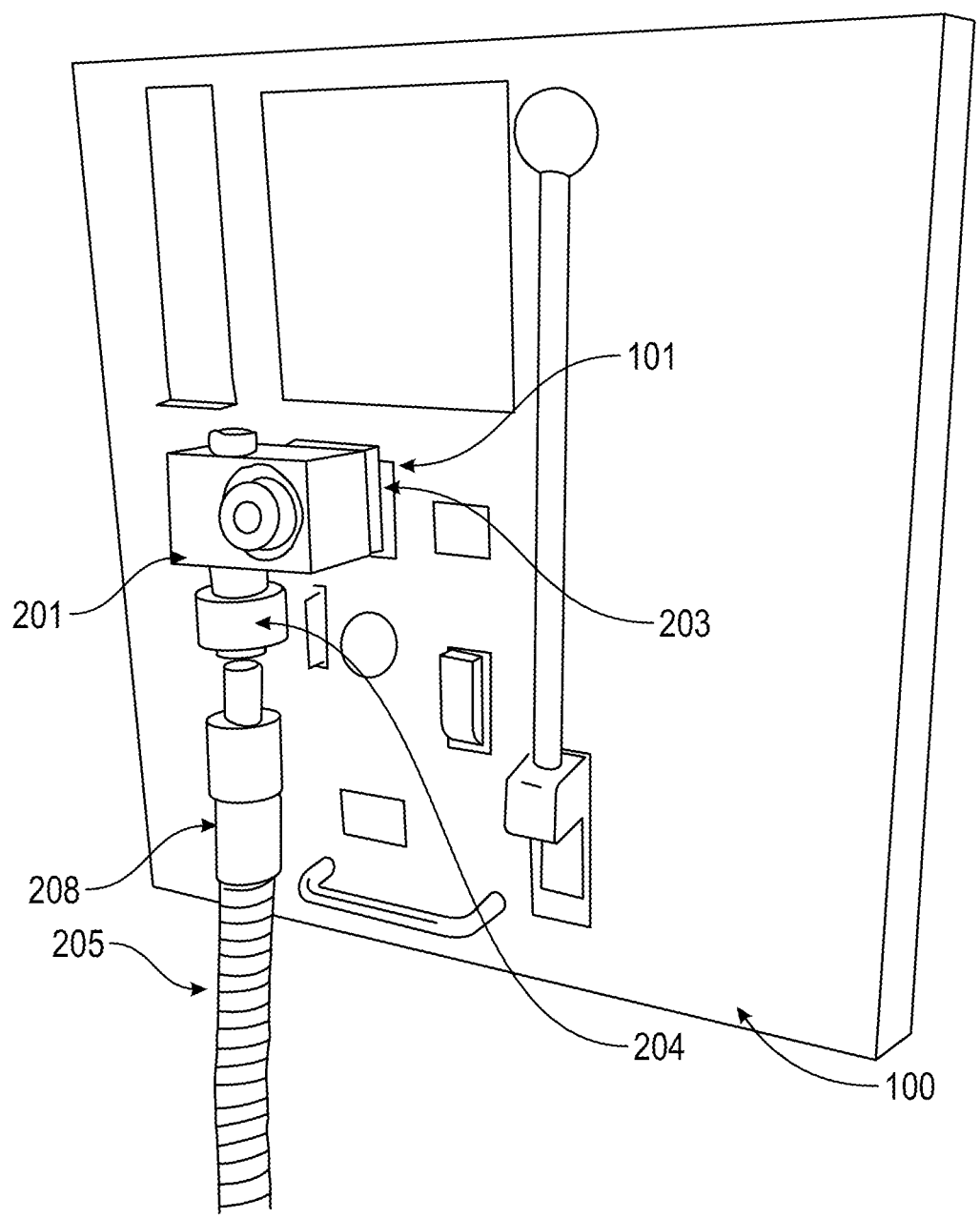
FIG. 3 illustrates a front, right perspective view of the drill motor racking apparatus of FIG. 2, showing the first end of the drill motor racking apparatus engaged to the circuit breaker.
Figure 4:
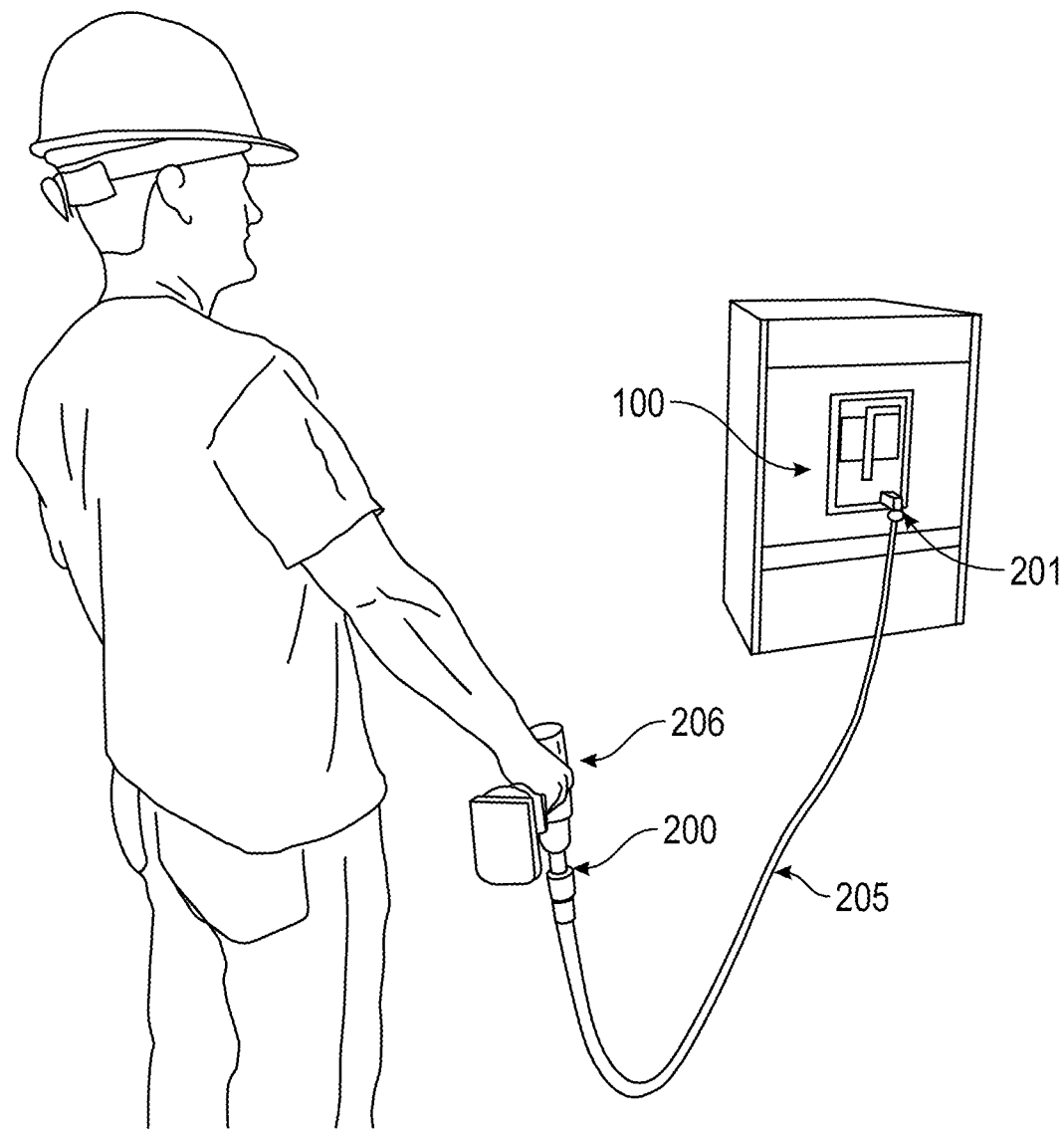
FIG. 4 illustrates a left, front perspective view of the drill motor racking apparatus, showing the first end of the drill motor racking apparatus engaged to the circuit breaker and a second end of the drill motor racking apparatus being operated by an operator via a drill.

FIG. 1 illustrates a front, right perspective view of a typical draw-out circuit breaker 100; FIG. 2 illustrates a rear, left perspective view of an exemplary drill motor racking apparatus 200, showing a first end capable of engaging the circuit breaker 100; FIG. 3 illustrates a front, right perspective view of the drill motor racking apparatus 200 of FIG. 2, showing the first end of the drill motor racking apparatus 200 engaged to the circuit breaker 100; and FIG. 4 illustrates a left, front perspective view of the drill motor racking apparatus 200, showing the first end of the drill motor racking apparatus 200 engaged to the circuit breaker 100 and a second end of the drill motor racking apparatus 200 being operated by an operator.

As shown in FIG. 1, the circuit breaker 100 comprises a racking mechanism 101.

In an embodiment, the circuit breaker 100 may be any suitable circuit breaker. For example, a suitable circuit breaker includes, but is not limited to, a draw-out circuit breaker. In an embodiment, the circuit breaker 100 may be a Cutler Hammer Westinghouse Low Voltage AC Power Circuit Breaker, or any equivalent thereof.

In an embodiment, the racking mechanism 101 may be any suitable mechanism to rack-in or rack-out the circuit breaker. For example, a suitable racking mechanism 101 includes, but is not limited to, a racking screw, a racking socket, or any variation thereof. In an embodiment, the racking mechanism 101 may be a racking screw. In an embodiment, the racking mechanism 101 may be a racking socket (not shown).

In an embodiment, the racking mechanism 101 may comprise one or more flats 101a. In an embodiment, the racking mechanism 101 may comprise one or more flats 101a on the racking screw. In an embodiment, the racking mechanism 101 may comprise one or more flats on the racking socket (not shown).

As shown in FIGS. 2 and 4, a drill motor racking apparatus 200 comprises a racking adapter/engagement head 203, a gearbox 201, a torque limiter 204, a flexible shaft cable 205 and a drill adapter 207.

In an embodiment, the drill motor racking apparatus 200 may be portable. In an embodiment, the drill motor racking apparatus 200 may be stationary.

In an embodiment, the drill motor racking apparatus 200 has a first end and a second end. In an embodiment, the first end of the drill motor racking apparatus 200 has a racking adapter/engagement head 203.

In an embodiment, the racking adapter/engagement head 203 comprises a socket 202. In an embodiment, the racking adapter/engagement head 203 may comprise one or more flats 202a on the socket 202.

In an embodiment, the racking adapter/engagement head 203 comprises a shaft (not shown). In an embodiment, the racking adapter/engagement head 203 may comprise one or more flats on the shaft (not shown).

In an embodiment, the racking adapter/engagement head 203 and the socket 202 may be geometrically designed to engage a racking mechanism/racking screw 101 of the circuit breaker 100. In an embodiment, the racking adapter/engagement head 203 in combination with the socket 202 may be designed to engage the racking mechanism/racking screw 101 of the circuit breaker 100 and to provide a mechanical method to counteract the anti-torque that is experienced by the racking adapter/engagement head 203 as the circuit breaker 100 is racked.

As shown in FIG. 2, the racking adapter/engagement head 203 may be installed by aligning the racking adapter/engagement head 203 and socket 202 to the racking screw 101 of the circuit breaker 100. It may be necessary to rotate the inner core of the flexible shaft cable 205 a few turns so that the socket 202 will align with one or more flats 101a on the racking screw 101 of the circuit breaker 100. The racking adapter/engagement head 203 is then fully inserted so that the socket 202 is fully engaged to the racking mechanism/racking screw 101 of the circuit breaker 100.

In an embodiment, the racking adapter/engagement head 203 may be held engaged to the racking screw 101 of the circuit breaker 100 by any suitable engagement means. For example, a suitable engagement means includes, but not limited to, a bracket, a friction fit (e.g., between physical shape and/or openings of the racking adapter/engagement head 203 and physical shape and/or openings of racking screw 101), a latch, a magnet, and combinations thereof. In an embodiment, the racking adapter/engagement head 203 may be held engaged to the racking screw 101 of the circuit breaker 100 by a friction fit.

In an embodiment, the gearbox 201 has an input and an output. In an embodiment, the gearbox 201 may be incorporated between the flexible shaft cable 205 and the racking adapter/engagement head 203 to provide a torque multiplication required to rack the circuit breaker 100.

In an embodiment, a mechanical torque limiter 204 may be incorporated into the input of the gearbox 201 and designed to limit torque to the racking screw 101 of the draw-out circuit breaker 100 so that the circuit breaker 100 is not damaged during the remote racking process.

As indicated in FIG. 3, the torque limiter 204 may be seen rotating during the breaker racking operation. When the circuit breaker 100 is fully racked-in or racked-out (depending which direction the circuit breaker 100 is being racked), the torque limiter 204 will release the rotational torque to the gearbox 201, thus limiting the torque being applied to the racking screw 101 of the draw-out circuit breaker 100.

In an embodiment, an ergonomic torque limiter may incorporated into the drill motor racking apparatus 200 and designed to limit torque to the racking screw 101 of the draw-out circuit breaker 100 so that the circuit breaker 100 is not damaged during the remote racking process. In an embodiment, the ergonomic torque limiter has a mechanical feedback in contact with an operator (e.g., arm, body, hand, shoulder of the operator).

In an embodiment, the drill motor racking apparatus 200 further comprises one or more of an audible alarm, a notification and a visual alarm when the torque limiter 204 reaches a limit. In an embodiment, the operator may be able to hear the audible alarm, read the notification or see the visual alarm from a distance to determine when the torque limiter 204 has reached the limit.

In an embodiment, the drill motor racking apparatus 200 further comprises clear or colorful labeling on the outer surface of the torque limiter 204. In an embodiment, the operator may be able to see the clear or colorful labeling from a distance to determine when the torque limiter 204 releases the rotational motion to into the gearbox 201.

In an embodiment, the flexible shaft cable 205 may be any suitable length as required by the application. For example, a suitable length may be from about 10-feet to about 30-feet, and any range or value there between. In an embodiment the flexible shaft cable 205 may be about 18-feet.

In an embodiment, the flexible shaft cable 205 comprises a nonconductive linkage or a nonconductive section to create a break in conductivity such that the operator may be insulated from an arc flash or an electrical discharge by the nonconductive linkage or section.

In an embodiment, the nonconductive linkage or the nonconductive section may be made of any suitable nonconductive material. For example, a suitable nonconductive material includes, but is not limited to, a nonmetallic material, and combinations thereof. In an embodiment, the nonconductive linkage or the nonconductive section may be made from a plastic or a polymer resin.

In an embodiment, the flexible shaft cable 205 has a first end and a second end. In an embodiment, a racking adapter/engagement head 203 may be connected to the first end of the flexible shaft cable 205. In an embodiment, the gearbox 201 is incorporated between the flexible shaft cable 205 and the racking adapter/engagement head 203 to provide a torque multiplication required to rack the circuit breaker.

In an embodiment, a drill adapter 207 may be attached to the second end of the flexible shaft cable 205.

In an embodiment, the flexible shaft cable 205 comprises a housing or a sleeve 208. In an embodiment, the housing or the sleeve 208 may be disposed around the second end of the flexible shaft cable 205.

In an embodiment, the flexible shaft cable 205 comprises a nonconductive housing or a nonconductive sleeve 208. In an embodiment, the nonconductive housing or the nonconductive sleeve 208 may be disposed around the second end of the flexible shaft cable 205.

In an embodiment, the housing or the sleeve 208 may be made of any suitable non-conductive material. For example, a suitable nonconductive material includes, but are not limited to a nonmetallic material, and combinations thereof. In an embodiment, the housing or the sleeve 208 may be made from a plastic or a polymer resin.

In an embodiment, the drill motor racking apparatus 200 further comprises a drill 206.

In an embodiment, the drill 206 may be any suitable commercially available drill or custom designed drill. For example, a suitable drill includes, but is not limited to, a corded drill (e.g., house powered at household current and voltage), a cordless drill (e.g., battery powered at battery current and voltage), a hand-held drill, a machine operated drill, and combinations thereof. In an embodiment, the drill 206 may be a Makita 18V ½-inch cordless drill.

In an embodiment, the drill 206 may be connected to the second end of the flexible shaft cable 205 and is used by the operator to effect the rotational motion on the flexible shaft cable 205 to remotely rack the circuit breaker 100.

In an embodiment, the drill motor racking apparatus 200 further comprises a revolution counter (not shown) capable of counting the revolutions of the drill 206. In an embodiment, the operator may be able to know the number of revolutions required to rack-out the circuit breaker 100, and, therefore, the operator may be able to know the number of revolutions that should be required to rack-in the circuit breaker 100.

As shown in FIG. 4, the drill motor racking apparatus 200 may be installed on circuit breaker 100 and operated by an operator via the drill 206, as discussed further below.

When the circuit breaker 100 is fully racked-in or racked-out (depending which direction the circuit breaker 100 is being racked), the operator may be able to detect reduction in torque being provided by the drill 206.

Method of Using Apparatus for Drill Motor Racking of Switchgear

Method to Rack-Out Circuit Breaker

As shown in FIGS. 4 and 5, a method to rack-out a circuit breaker 500 comprises: (a) an operator inserts a racking adapter of a drill motor racking apparatus into a racking mechanism of a circuit breaker 505, (b) the operator inserts a drill adapter of the drill motor racking apparatus into a chuck of a drill 510, (c) the operator operates the drill counterclockwise (or clockwise depending on the circuit breaker) to rack-out the circuit breaker 515, and (d) the operator stops operation of the drill when the circuit breaker reaches a test position or a remove position 520.

In an embodiment, step (a) 505 comprises (a-1) an operator presses and holds a trip button on a circuit breaker to expose a racking mechanism.

In an embodiment, step (a) 505 comprises (a-2) the operator identifies a racking adapter of a drill motor racking apparatus.

In an embodiment, step (a) 505 comprises (a-3) the operator inserts the racking adapter of the drill motor racking apparatus into a racking mechanism of a circuit breaker. In an embodiment, step (a) 505 comprises (a-3) the operator inserts the racking adapter of the drill motor racking apparatus into a racking mechanism of a circuit breaker to fully engage the racking mechanism. In an embodiment, step (a) 505 comprises (a-3) the operator inserts the racking adapter of the drill motor racking apparatus into a racking mechanism of a circuit breaker to fully engage the racking mechanism by pushing the racking adapter straight in.

In an embodiment, step (b) 510 comprises (b-1) the operator identifies a drill adapter of a drill motor racking apparatus.

In an embodiment, step (b) 510 comprises (b-2) the operator inserts the drill adapter of the drill motor racking apparatus into a chuck of a drill.

In an embodiment, step (b) 510 comprises (b-3) the operator tightens the chuck of the drill until the drill adapter of the drill motor racking apparatus is secure in the chuck of the drill.

In an embodiment, step (c) 515 comprises (c-1) the operator securely grasps the drill in one hand and a housing or a sleeve of the drill motor racking apparatus securely in the other hand.

In an embodiment, step (c) 515 comprises (c-2) the operator operates the drill counterclockwise (or clockwise depending on the circuit breaker) to rack-out the circuit breaker.

In an embodiment, step (d) 520 comprises (d-1) the operator may stops operation of the drill when the circuit breaker reaches the test position. In an embodiment, step (d) comprises (d-2) the operator may stops operation of the drill when the circuit breaker reaches the remove position.

Method to Rack-In Circuit Breaker

As shown in FIGS. 4 and 6, a method to rack-in a circuit breaker 600 comprises: (a) an operator inserts a racking adapter of a drill motor racking apparatus into a racking mechanism of a circuit breaker 605, (b) the operator inserts a drill adapter of the drill motor racking apparatus into a chuck of a drill 610, (c) the operator operates the drill clockwise (or counterclockwise depending on the circuit breaker) to rack-in the circuit breaker 615, (d) the operator stops the operation of the drill when the circuit breaker reaches a connected position 620.

In an embodiment, step (a) 605 comprises (a-1) an operator presses and holds a trip button on a circuit breaker to expose a racking mechanism.

In an embodiment, step (a) 605 comprises (a-2) the operator identifies a racking adapter of a drill motor racking apparatus.

In an embodiment, step (a) 605 comprises (a-3) the operator inserts the racking adapter of the drill motor racking apparatus into a racking mechanism of a circuit breaker. In an embodiment, step (a) 605 comprises (a-3) the operator inserts the racking adapter of the drill motor racking apparatus into a racking mechanism of a circuit breaker to fully engage the racking mechanism. In an embodiment, step (a) 605 comprises (a-3) the operator inserts the racking adapter of the drill motor racking apparatus into a racking mechanism of a circuit breaker to fully engage the racking mechanism by pushing the racking adapter straight in.

In an embodiment, step (b) 610 comprises (b-1) the operator identifies a drill adapter of a drill motor racking apparatus.

In an embodiment, step (b) 610 comprises (b-2) the operator inserts the drill adapter of the drill motor racking apparatus into a chuck of a drill.

In an embodiment, step (b) 610 comprises (b-3) the operator tightens the chuck of the drill until the drill adapter of the drill motor racking apparatus is secure in the chuck of the drill.

In an embodiment, step (c) 615 comprises (c-1) the operator securely grasps the drill in one hand and a housing or a sleeve of the drill motor racking apparatus securely in the other hand.

In an embodiment, step (c) 615 comprises (c-2) the operator operates the drill clockwise (or counterclockwise depending on the circuit breaker) to rack-in the circuit breaker.

In an embodiment, step (d) 620 comprises (d-1) the operator stops operation of the drill when the circuit breaker reaches a connected position.

In an embodiment, the method further comprises (e) the operator removes the racking adapter of the drill motor racking apparatus from the racking mechanism of the circuit breaker 625.

In an embodiment, step (e) 625 comprises (e-1) the operator loosens the chuck of the drill until the drill adapter of the drill motor racking apparatus is loose in the chuck of the drill.

In an embodiment, step (e) 625 comprises (e-2) the operator removes the drill adapter of the drill motor racking apparatus from the chuck of the drill.

In an embodiment, step (e) 625 comprises (e-3) the operator remove the racking adapter of the drill motor racking apparatus from the racking mechanism of the circuit breaker. In an embodiment, step (e) 625 comprises (e-3) the operator removes the racking adapter of the drill motor racking apparatus from the racking mechanism of the circuit breaker to fully disengage the racking mechanism. In an embodiment, step (e) 625 comprises (e-3) the operator removes the racking adapter of the drill motor racking apparatus from the racking mechanism of the circuit breaker to fully disengage the racking mechanism by pulling the racking adapter straight out.

Although the preceding description has been described herein with reference to particular circuits and embodiments, it is not intended to be limited to the particulars disclosed herein; rather, it extends to all functionally equivalent structures, methods, and uses, such as are within the scope of the appended claims.

The embodiments and examples set forth herein are presented to best explain the present invention and its practical application and to thereby enable those skilled in the art to make and utilize the invention. However, those skilled in the art will recognize that the foregoing description and examples have been presented for the purpose of illustration and example only. The description as set forth is not intended to be exhaustive or to limit the invention to the precise form disclosed. Many modifications and variations are possible in light of the above teaching without departing from the spirit and scope of the following claims. The invention is specifically intended to be as broad as the claims below and their equivalents.

DEFINITIONS

As used herein, the terms "a," "an," "the," and "said" means one or more, unless the context dictates otherwise.

As used herein, the term "about" means the stated value plus or minus a margin of error, or plus or minus 10% if no method of measurement is indicated.

As used herein, the term "or" means "and/or" unless explicitly indicated to refer to alternatives only or if the alternatives are mutually exclusive.

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the terms "containing," "contains," and "contain" have the same open-ended meaning as "comprising," "comprises," and "comprise," provided above.

As used herein, the terms "having," "has," and "have" have the same open-ended meaning as "comprising," "comprises," and "comprise," provided above.

As used herein, the terms "including," "includes," and "include" have the same open-ended meaning as "comprising," "comprises," and "comprise," provided above.

As used herein, the phrase "consisting of" is a closed transition term used to transition from a subject recited before the term to one or more material elements recited after the term, where the material element or elements listed after the transition term are the only material elements that make up the subject.

As used herein, the term "simultaneously" means occurring at the same time or about the same time, including concurrently.

INCORPORATION BY REFERENCE

All patents and patent applications, articles, reports, and other documents cited herein are fully incorporated by reference to the extent they are not inconsistent with this invention.

What is claimed is:

1. A drill motor racking apparatus for remote operation of a circuit breaker, the apparatus comprising:
    a racking adapter, wherein the racking adapter is adapted to be engaged by and secured in a racking mechanism of the circuit breaker;
    a gearbox having an input and an output;
    a flexible shaft cable having a first end and a second end, wherein the racking adapter is connected to the first end of the flexible shaft cable and wherein the gearbox is incorporated between the flexible shaft cable and the racking adapter to provide a torque multiplication required to rack the circuit breaker; and
    a drill adapter adapted to be engaged by and secured in a drill, wherein the drill adapter is attached to the second end of the flexible shaft cable.

2. The apparatus of claim 1, wherein the racking adapter comprises a socket.

3. The apparatus of claim 1, wherein the racking adapter comprises a shaft.

4. The apparatus of claim 1, wherein the flexible shaft cable is from about 10-feet to about 30-feet.

5. The apparatus of claim 1, wherein the flexible shaft cable is from about 15-feet to about 20-feet.

6. The apparatus of claim 1, wherein the flexible shaft cable is about 18-feet.

7. The apparatus of claim 1, further comprising a housing or a sleeve, wherein the housing or the sleeve is disposed around the second end of the flexible shaft cable.

8. The apparatus of claim 1, further comprising a non-conductive housing or a nonconductive sleeve, wherein the nonconductive housing or the nonconductive sleeve is disposed around the second end of the flexible shaft cable.

9. The apparatus of claim 8, wherein the nonconductive housing or the nonconductive sleeve is made of plastic or polymer resin.

10. The apparatus of claim 1, wherein the flexible shaft cable comprises a nonconductive linkage or a nonconductive section.

11. The apparatus of claim 10, wherein the nonconductive linkage or the nonconductive section is made of plastic or polymer resin.

12. The apparatus of claim 1, wherein the racking adapter is adapted to be secured to the racking mechanism of the circuit breaker by an engagement means.

13. The apparatus of claim 12, wherein the engagement means is one or more of a bracket, a friction fit, a latch, and a magnet.

14. The apparatus of claim 12, wherein the engagement means is a friction fit.

15. The apparatus of claim 1, further comprising an ergonomic or mechanical torque limiter to limit torque to the circuit breaker.

16. The apparatus of claim 15, wherein the ergonomic torque limiter has a mechanical feedback in contact with an operator.

17. The apparatus of claim 15, wherein the mechanical torque limiter is incorporated in the input of the gearbox.

18. The apparatus of claim 15, further comprising one or more of an audible alarm, a notification, and a visual alarm when the torque limiter reaches a limit.

19. The apparatus of claim 15, further comprising one or more of an audible alarm, a notification, and a visual alarm when the torque limiter releases rotational motion into the gearbox.

20. The apparatus of claim 1, wherein the drill adapter is engaged by and secured in the drill.

21. The apparatus of claim 20, wherein the drill is a cordless drill.

22. The apparatus of claim 20, wherein the drill is a corded drill.

23. The apparatus of claim 20, wherein the drill is hand operated.

24. The apparatus of claim 20, wherein the drill is machine operated.

25. The apparatus of claim 20, further comprising a revolution counter, wherein the revolution counter counts revolutions of the drill.

\* \* \* \* \*